United States Patent
Nakamoto et al.

(10) Patent No.: US 11,345,635 B2
(45) Date of Patent: May 31, 2022

(54) SURFACE TREATMENT METHOD FOR SAND AGGREGATE AND METHOD FOR PRODUCING READY-MIXED CONCRETE

(71) Applicant: Tech Corporation Co., Ltd., Hiroshima (JP)

(72) Inventors: Yoshinori Nakamoto, Hiroshima (JP); Mituhito Ishida, Osaka (JP); Kiyohito Yukimoto, Osaka (JP); Masato Hada, Osaka (JP)

(73) Assignee: TECH CORPORATION CO., LTD., Hiroshima (JP)

( * ) Notice: Subject to any disclaimer, the term of this patent is extended or adjusted under 35 U.S.C. 154(b) by 0 days.

(21) Appl. No.: 16/343,734

(22) PCT Filed: Oct. 20, 2017

(86) PCT No.: PCT/JP2017/037959
§ 371 (c)(1),
(2) Date: Apr. 19, 2019

(87) PCT Pub. No.: WO2018/074580
PCT Pub. Date: Apr. 26, 2018

(65) Prior Publication Data
US 2019/0270673 A1    Sep. 5, 2019

(30) Foreign Application Priority Data
Oct. 21, 2016 (JP) .............................. JP2016-206907

(51) Int. Cl.
*C04B 20/10* (2006.01)
*C04B 20/02* (2006.01)
(Continued)

(52) U.S. Cl.
CPC .............. *C04B 28/02* (2013.01); *B01F 23/20* (2022.01); *C04B 14/045* (2013.01); *C04B 14/06* (2013.01);
(Continued)

(58) Field of Classification Search
None
See application file for complete search history.

(56) References Cited

U.S. PATENT DOCUMENTS 2,917,395 A * 12/1959 Csanyi .................. C09K 17/34
106/122
3,758,319 A * 9/1973 Ergene .................... C04B 28/02
523/218
(Continued)

FOREIGN PATENT DOCUMENTS

CN    113185167 A *  7/2021
JP    11-79818 A    3/1999
(Continued)

OTHER PUBLICATIONS

International Search Report issued in application No. PCT/JP2017/037959 dated Dec. 12, 2017.
(Continued)

*Primary Examiner* — Charles R Nold
(74) *Attorney, Agent, or Firm* — Sughrue Mion, PLLC

(57) ABSTRACT

A method for treating aggregate to be used in cement is designed to perform surface treatment on aggregate by bringing fine bubble water containing fine bubbles into contact with the aggregate. The treated aggregate is used as a material for ready-mixed concrete to prepare concrete. The fine bubble water is produced by a high-speed swirling method, a pressure releasing method, or a combination thereof. The dispersibility of the aggregate is improved by the surface treatment.

7 Claims, 4 Drawing Sheets

(51) Int. Cl.
*B01F 23/20* (2022.01)
*C04B 28/02* (2006.01)
*C04B 14/04* (2006.01)
*C04B 14/06* (2006.01)
*C04B 22/08* (2006.01)
*C04B 24/24* (2006.01)

(52) U.S. Cl.
CPC ............ *C04B 20/023* (2013.01); *C04B 22/08* (2013.01); *C04B 24/24* (2013.01); *C04B 2201/05* (2013.01)

(56) References Cited

U.S. PATENT DOCUMENTS

| | | | |
|---|---|---|---|
| 2016/0200965 A1* | 7/2016 | Farion | B05B 1/04 507/233 |
| 2019/0344474 A1* | 11/2019 | Bauer | B28C 5/388 |

FOREIGN PATENT DOCUMENTS

| | | | |
|---|---|---|---|
| JP | 2003-266057 A | | 9/2003 |
| JP | 2007-261119 A | | 10/2007 |
| JP | 2007-269623 A | | 10/2007 |
| JP | 2009-137026 A | | 6/2009 |
| JP | 2012-188338 A | | 10/2012 |
| JP | 2014-108919 A | | 6/2014 |
| JP | 2017008651 | * | 1/2017 |
| JP | 2017222523 A | * | 12/2017 |

OTHER PUBLICATIONS

Toshihiko Shakouchi et al., "Recycling of Waste Concrete and Fixation of Carbon Dioxide by Micro Bubble Jet Flow", Journal of JSEM, vol. 11, Special Issue (2011) pp. SS59-SS65, XP-002793293 (7 pages total).

* cited by examiner

SURFACE TREATMENT METHOD FOR SAND AGGREGATE AND METHOD FOR PRODUCING READY-MIXED CONCRETE

BACKGROUND OF THE INVENTION

Field of the Invention

The present invention relates to a surface treatment method for sand material (aggregate) to be used, for example, to produce ready-mixed concrete, a storage method for sand material, and a method for producing ready-mixed concreate using surface-treated aggregate.

Description of the Related Art

In conventional art, aggregate including sand material and others, cement, and water are mixed to produce ready-mixed concrete. It is known that a dispersing agent is used in this mixing procedure in order to disperse the aggregate sufficiently (for example, see Japanese Laid-open Patent Publication No. 2015-120630).

The inventors of the subject application have discovered that it is possible to improve the properties of aggregate by performing surface treatment on the aggregate in advance, and thus to improve the properties of concrete.

SUMMARY OF THE INVENTION

According to one aspect, there is provided an aggregate surface treatment method that is designed to perform surface treatment on aggregate for ready-mixed concrete by bringing fine bubble water containing fine bubbles into contact with the aggregate.

In addition, a method for producing ready-mixed concrete is designed to mix surface-treated aggregate, which is prepared by bringing fine bubble water containing fine bubbles into contact with aggregate for ready-mixed concrete, cement, and water.

The object and advantages of the invention will be realized and attained by means of the elements and combinations particularly pointed out in the claims.

It is to be understood that both the foregoing general description and the following detailed description are exemplary and explanatory and are not restrictive of the invention.

DETAILED DESCRIPTION OF THE PREFERRED EMBODIMENT

Figure 1:
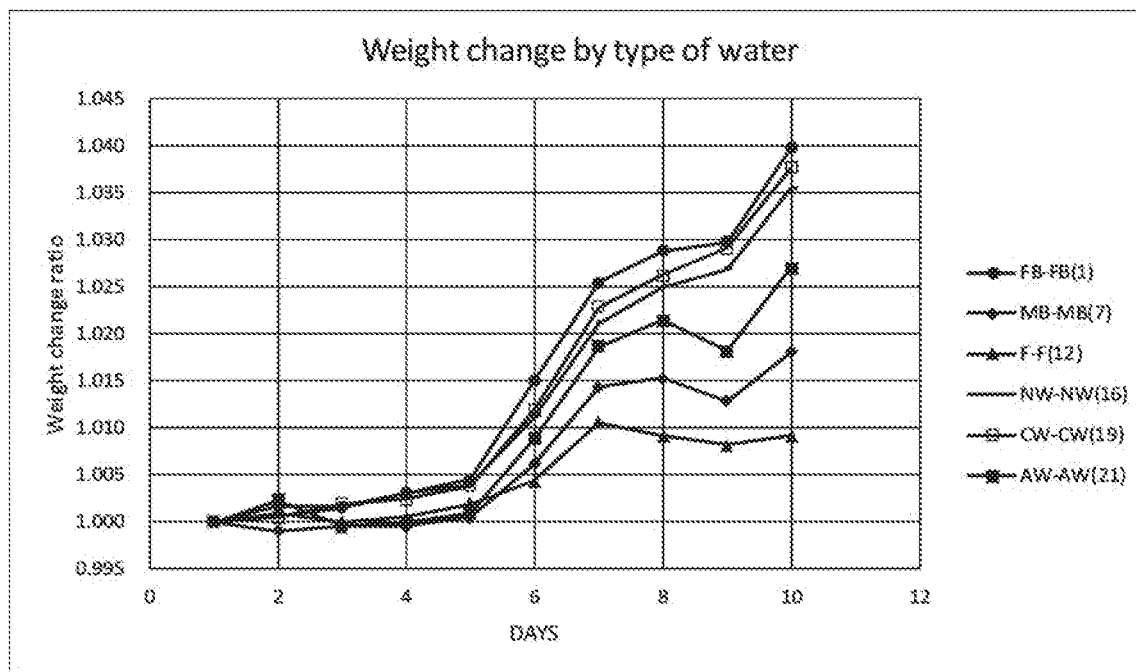
FIG. 1 is a graph representing weight changes with different types of water.

Embodiments of the present invention will now be described with reference to the accompanying drawings.

According to this invention, a method for producing ready-mixed concrete is designed to mix cement, water, and aggregate for ready-mixed concrete to thereby produce ready-mixed concrete. Note that a publicly known general method for producing ready-mixed concrete is used, except that surface treatment is performed on the aggregate.

The cement to be used here is not particularly limited, and any existing type of cement may be used. Examples of such cement include various types of Portland cement including ordinary Portland cement, high-early-strength Portland cement, moderate-heat Portland cement, low-heat Portland cement, and white Portland cement, blast-furnace slag cement, alumina cement, pozzolanic cement, and silica fume cement.

The water to be used here is not particularly limited, and general water such as tap water or industrial water is preferably used. Alternatively, fine bubble water may be used, or fine bubble water once used in surface treatment, which will be described later, may be reused as it is.

In this connection, throughout the specification, fine bubble water refers to water containing nano-scale (1 nm to 1000 nm) fine bubbles, and preferably contains fine bubbles at a concentration of 0.1E08 pieces/ml or more, more preferably 0.2E08 pieces/ml or more. Gas that is contained as the fine bubbles is not particularly limited, and air, oxygen, nitrogen, or hydrogen is preferably used. The mean diameter of the fine bubbles is not particularly limited, and preferably ranges about from 50 to 250 nm.

A method for producing fine bubble water is not particularly limited, and a pressure releasing method for generating fine bubbles by dissolving gas under pressure and then releasing the pressure, a high-speed swirling method for generating fine bubbles with high-speed swirling, or a combination of these is preferably used, for example. These methods for producing fine bubble water are described in, for example, PTL2 (Japanese Laid-open Patent Publication No. 2015-34628).

The aggregate for ready-mixed concrete to be used here is not particularly limited, and existing aggregate may be used. Examples of such aggregate include natural sand, such as silica sand, fine aggregate, such as crushed stone powder, and coarse aggregate, such as crushed stone. As the fine aggregate, sand produced following JIS A 5005:2009 is preferably used. In addition, as the coarse aggregate, coarse aggregate 1505 or coarse aggregate 2010 produced following JIS A5005 is preferably used. One type of aggregate or a mixture of plural types of aggregate may be used.

According to the present invention, surface treatment (to be described in detail later) is performed on aggregate. Particularly, by applying this invention to sand material of 0.6 mm mesh or finer, it becomes possible to prevent sand fixation due to drying. In addition, by applying the invention to fine sand material of 0.1 mm mesh or finer, it becomes possible to use, as the aggregate, sand materials that have not been used so far.

For producing ready-mixed concrete, components other than cement, water, and aggregate may be added. For example, chemical admixtures, such as fly ash, slag powder, surfactants, such as air entraining (AE) agent, and AE water-reducing agent may be added, where appropriate.

In addition, the content of cement preferably ranges from 5 to 15 volume percent of the total volume of cement, fly ash, and aggregate, more preferably from 5 to 12 volume percent. If the content of cement is too low, a finished concrete structure is likely to have insufficient strength. If the content of cement is too high, it means that the content of fly ash becomes low accordingly, so that pozzolanic reaction does not proceed as expected and the finished concrete has insufficient strength. Therefore, these are not preferable.

In addition, the content of fly ash preferably ranges from 0.1 to 15 volume percent of the total volume of the cement, fly ash, and aggregate, more preferably from 1.5 to 11 volume percent.

Further, the content of water preferably ranges from 15 to 30 volume percent of the total volume of the cement, fly ash, and aggregate, more preferably from 19 to 24 volume percent. If the content of water is too low, ready-mixed concrete produced has a low fluidity and thus exhibits poor workability when poured into a mold. If the content of water is too high, a finished concrete structure has insufficient strength. Therefore, these are not preferable.

The content of aggregate preferably ranges from 70 to 95 volume percent of the total volume of the cement, fly ash, and aggregate, more preferably from 80 to 92 volume percent. The ratio of fine aggregate and coarse aggregate is preferably in a range of about 1:1 to 1:3, more preferably 1:1.5 to 1:2.5.

The surface treatment of aggregate is performed by bringing fine bubble water into contact with the aggregate. For example, the aggregate is sprayed with fine bubble water in order to bring the fine bubble water into contact with the surface of the aggregate. Alternatively, the aggregate may be impregnated with the fine bubble water and then, the fine bubble water may be removed by evaporation through natural drying, heat drying or the like, or by filtering with a filter or the like.

For example, sand material loaded on the back of a truck is showered with fine bubble water using a cylindrical member that is longer than the width of the back of the truck and has a plurality of holes. At this time, the truck is moved back and force so that the entire back of the truck is showered with the fine bubble water. By doing so, the fine bubble water is scattered entirely over the sand material loaded on the back of the truck. Alternatively, a sprayer that sprays mist of fine bubble water may be used.

It is considered that as the effects of fine bubble water, the fine bubble water penetrates aggregate and improves the dispersibility. Therefore, by soaking the aggregate in the fine bubble water for a prescribed period of time or by mixing and stirring the aggregate in the fine bubble water, further improved dispersibility is expected. Since the fine bubble water has low surface tension and high penetration capability, it is possible to perform the surface treatment in a short time.

Surface-treated aggregate has high water retention capability and is unlikely to cake due to drying. That is, such aggregate is unlikely to harden into lumps, and so exhibits improved dispersibility when being mixed into ready-mixed concrete. That is, it is possible to achieve workability enhancement in the mixing step. In addition, since the ready-mixed concrete contains the aggregate with high uniform dispersibility, a finished concrete structure has an improved strength.

Further, note that fine bubble water is superior in removal of particulates and dirt. Therefore, by removing particulates and dirt together with fine bubble water through filtration or elimination of supernatant water after surface treatment, it is possible to improve the fluidity of ready-mixed concrete and further improve the strength of a finished concrete structure.

Surface-treated aggregate has high water retention capability, and does not lower its dispersibility even if tap water is added thereto. Therefore, it is possible that the surface treatment is performed on aggregate in a factory or the like and then the surface-treated aggregate is mixed with cement and others at another location to produce ready-mixed concrete.

In addition, the use of fine bubble water in the surface treatment improves the soundness of the aggregate and lowers the risk of darkening of the aggregate, so as to improve the properties of the aggregate. As a result, it is possible to improve the properties of concrete.

In this connection, darkening is a phenomenon in which fine micas appear on the surface of concrete. It does not influence the properties of concrete but forms a mottled pattern on the surface of concrete, which causes an appearance problem. In general, a chemical processing agent is used to lower the risk of such darkening. In view of this, prevention of darkening eliminates the need of such chemical processing agents, which leads to a cost reduction.

In addition, the use of fine bubble water in producing concrete improves the dispersibility of cement and micas to lower the risk of darkening, and also improves the dispersibility of cement and aggregate to improve the properties of concrete.

EXAMPLES

The following describes embodiments of the above-described surface treatment performed on aggregate.

First Embodiment

Six types of water were prepared for use in experiments.

Fine bubble water (FB): Well water was used as raw water, and fine bubbles were contained at a concentration of 0.1E08 pieces/ml or more.

Millibubble water (MB): pH 10.5, produced by bubbling recycled water.

Fluoride-containing acid water (F): Acid water at pH3 (groundwater in the vicinity of Naga Oyama, Kawatsura, Takarazuka-shi, Hyogo prefecture), and fluorine compounds were contained at a concentration of about 0.5 to 2.5 mg/ml.

Industrial water (NW): Industrial water supplied by Osaka prefecture.

Rinse-in industrial water (CW): Produced by diluting rinse on sale with industrial water by a factor of 10,000.

Detergent-in industrial water (AW): Produced by diluting MYPET (registered trademark) on sale with industrial water by a factor of 10,000.

Sand used in experiments: Crushed sand A for concrete, produced by OSAKA SAISEKI Co., Ltd.

200 g of sand was sprayed with 10 g of water and stored in a plastic container without a lid for one day (24 hours), and then its weight and surface temperature were measured. After the measurement, the sand was sprayed with 10 g of water. This process was repeated every day for ten days.

In addition, for samples No. 2 to 6, fine bubble water (FB) and another type of water were used for the spraying alternately (every other day).

The table 1 depicts the measurement results of weight. In this connection, the data was obtained before spraying of water, and taking the weight on the first day as "1," each result on the second and following days are expressed as a weight change ratio with respect to the initial weight.

FB-FB indicates that fine bubble water (FB) was sprayed every day. FB-MB indicates that fine bubble water (FB) and millibubble water (MB) were sprayed alternately (FB on the first day, MB on the second day, FB on the third day, MB on the fourth day, . . . ).

TABLE 1

| No. | Sample | Initial Weight (g) | Weight change ratio (%) | | | | | | | | | |
|---|---|---|---|---|---|---|---|---|---|---|---|---|
| | | | 1 | 2 | 3 | 4 | 5 | 6 | 7 | 8 | 9 | 10 |
| 1 | FB-FB(1) | 209.76 | 1 | 1.002 | 1.002 | 1.003 | 1.004 | 1.015 | 1.025 | 1.029 | 1.030 | 1.040 |
| 2 | FB-MB(2) | 209.50 | 1 | 1.001 | 1.001 | 1.002 | 1.004 | 1.013 | 1.021 | 1.024 | 1.018 | 1.026 |
| 3 | FB-F(3) | 209.53 | 1 | 1.001 | 1.001 | 1.002 | 1.004 | 1.013 | 1.023 | 1.028 | 1.029 | 1.038 |
| 4 | FB-NW(4) | 209.67 | 1 | 1.001 | 1.001 | 1.002 | 1.003 | 1.011 | 1.019 | 1.021 | 1.021 | 1.033 |
| 5 | FB-CW(5) | 209.74 | 1 | 1.001 | 1.001 | 1.001 | 1.003 | 1.009 | 1.019 | 1.019 | 1.017 | 1.024 |
| 6 | FB-AW(6) | 209.71 | 1 | 1.002 | 1.002 | 1.001 | 1.003 | 1.009 | 1.018 | 1.018 | 1.016 | 1.022 |
| 7 | MB-MB(7) | 210.20 | 1 | 0.999 | 1.000 | 1.000 | 1.000 | 1.006 | 1.014 | 1.015 | 1.013 | 1.018 |
| 12 | F-F(12) | 210.09 | 1 | 1.001 | 1.000 | 1.001 | 1.002 | 1.004 | 1.011 | 1.009 | 1.008 | 1.009 |
| 16 | NW-NW(16) | 209.57 | 1 | 1.001 | 1.002 | 1.003 | 1.004 | 1.011 | 1.021 | 1.025 | 1.027 | 1.035 |
| 19 | CW-CW(19) | 210.09 | 1 | 1.001 | 1.002 | 1.002 | 1.004 | 1.012 | 1.023 | 1.026 | 1.029 | 1.038 |
| 21 | AW-AW(21) | 215.20 | 1 | 1.002 | 1.000 | 1.000 | 1.001 | 1.009 | 1.019 | 1.021 | 1.018 | 1.027 |

The table 2 depicts the measurement results of surface temperature. In the table 2, the actual measurement values are indicated for sample No. 16 in which industrial water was used, whereas the results for the other samples are each expressed as a temperature difference from a measurement value of sample No. 16. As in the weight measurement, the surface temperatures were measured immediately before spraying of water.

TABLE 2

| No. | Sample | 1 | 2 | 3 | 4 | 5 | 6 | 7 | 8 | 9 | 10 |
|---|---|---|---|---|---|---|---|---|---|---|---|
| 1 | FB-FB(1) | −1.9 | −0.6 | 1.2 | −1.7 | −0.1 | −0.2 | −0.9 | −0.1 | −1.6 | −1 |
| 2 | FB-MB(2) | −2.3 | −1 | 1.5 | −1.8 | 0.3 | −0.3 | −1 | −0.1 | −1.8 | −0.7 |
| 3 | FB-F(3) | −2.5 | −0.6 | 1.3 | −1.1 | −0.1 | −0.2 | −0.5 | 0.1 | −1.1 | −0.9 |
| 4 | FB-NW(4) | −2.2 | −0.4 | 1.1 | −1.4 | 0.4 | 0 | −0.6 | −0.2 | −1 | −1 |
| 5 | FB-CW(5) | −2.4 | −0.4 | 1.5 | −1.7 | 0.3 | 0.2 | −0.7 | 0 | −0.9 | −0.7 |
| 6 | FB-AW(6) | −2.1 | −0.6 | 0.9 | −1.6 | 0.6 | 0.2 | −0.6 | 0.1 | −0.7 | −1 |
| 7 | MB-MB(7) | −2 | 0.1 | 0.4 | 0 | 0.1 | 0 | −0.5 | −0.1 | 0.3 | −0.1 |
| 12 | F-F(12) | −1.7 | −0.5 | 0.8 | −1 | 0.4 | 0.1 | −0.1 | 0.6 | −0.1 | −0.3 |
| 16 | NW-NW(16) | 26.9 | 26.4 | 24.9 | 27.5 | 27.2 | 26.2 | 25.8 | 26.1 | 26.7 | 25.0 |
| 19 | CW-CW(19) | −0.7 | 0.3 | 0 | −0.6 | −0.2 | 0.3 | 0.2 | 0 | −0.4 | −0.1 |
| 21 | AW-AW(21) | −0.5 | | 0.3 | −0.2 | 0.1 | 0.2 | −0.1 | 0.2 | 0.3 | −0.2 |

As is understood from FIG. 1, the sample with spraying of fine bubble water every day exhibits the highest water retention rate, i.e., is unlikely to get dry. Therefore, it is possible to prevent fixation due to drying and consequently to improve the dispersibility.

Figure 2:
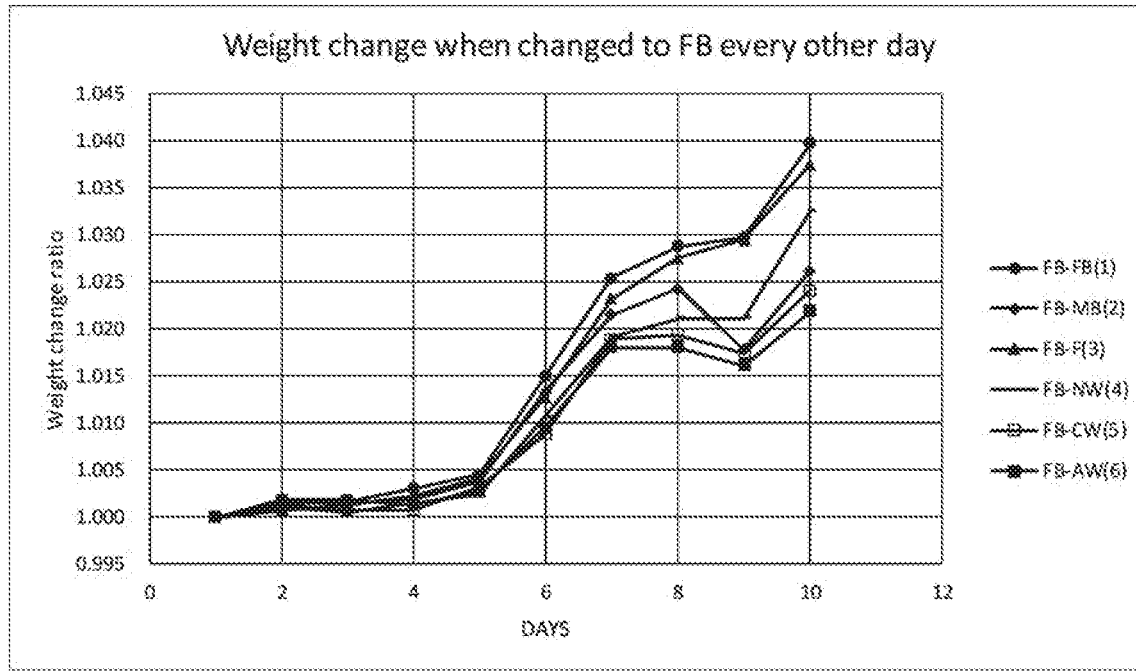
FIG. 2 is a graph representing weight changes in response to spraying of fine bubble water every other day.

In addition, as seen in FIG. 2, it is confirmed that even the samples with spraying of fine bubble water every other day exhibit an improvement in water retention capability.

Figure 3:
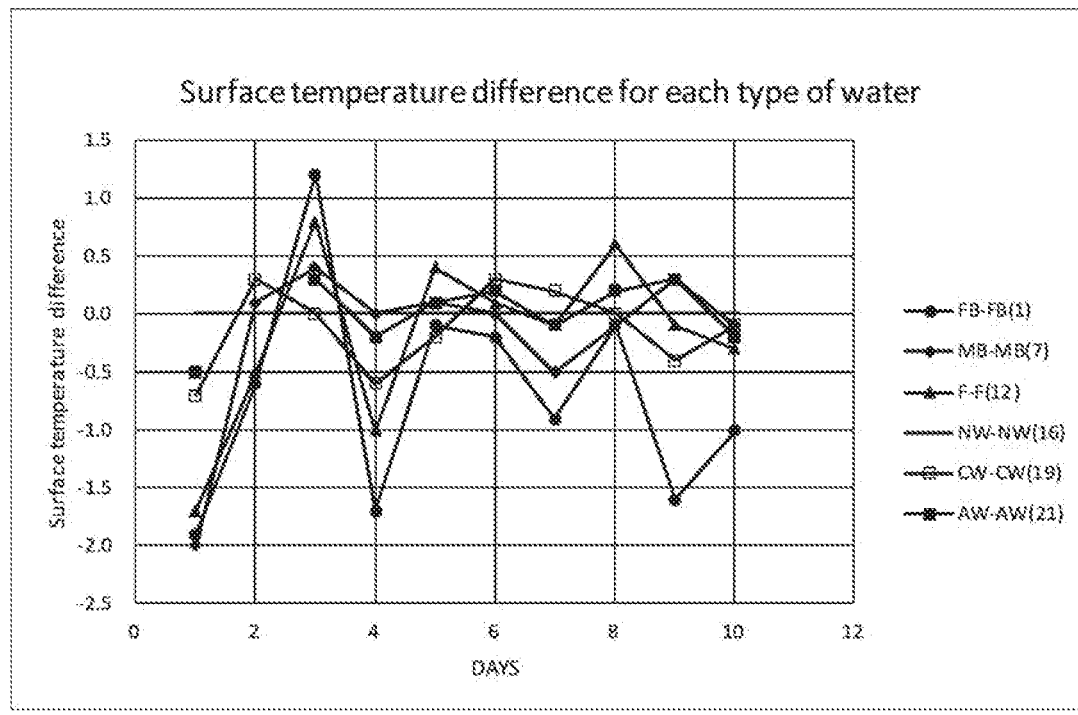
FIG. 3 is a graph representing surface temperature differences with different types of water.
Figure 4:
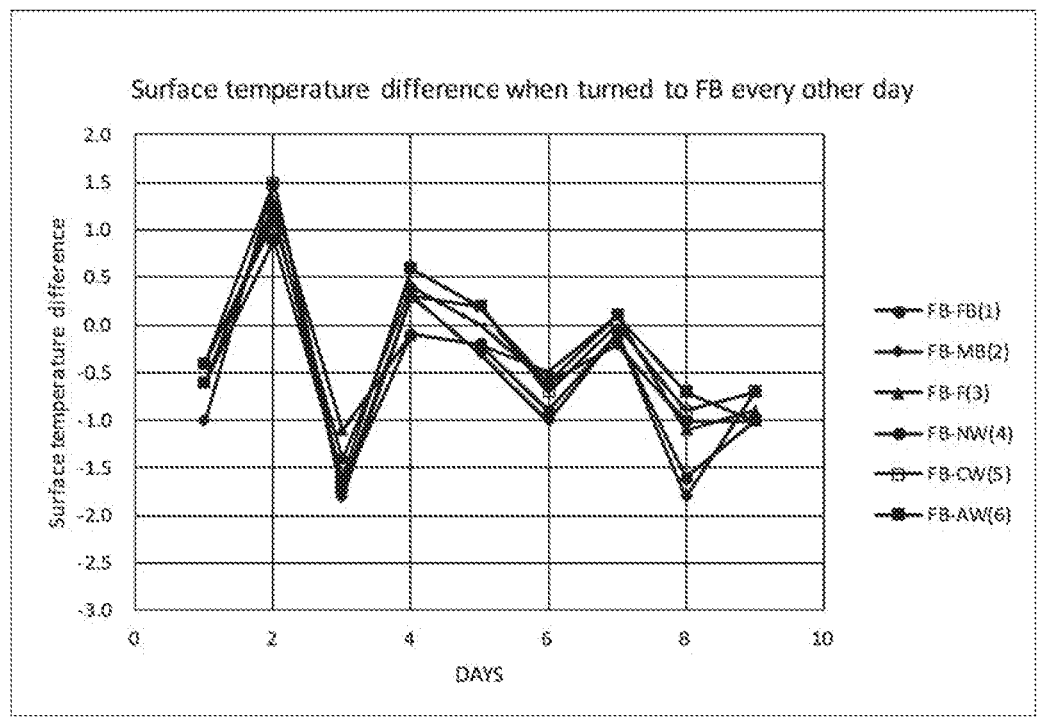
FIG. 4 is a graph representing surface temperature differences in response to spraying of fine bubble water every other day.

As seen in FIGS. 3 and 4, the surface temperatures of sands, which have different tendencies with different types of water, come to exhibit similar tendencies through spraying of fine bubble water even every other day. Accordingly, it is recognized that fine bubble water has a great influence on the sand surface.

Second Embodiment

The following describes an alkali-silica reactivity test of aggregate subjected to fine bubble water treatment and untreated aggregate.

The following five types of sand materials were prepared as aggregate samples.

1: Andesite crushed sand, produced in Hita-shi, Oita prefecture
2: Crushed sand, produced in Tajimi-shi, Gifu prefecture
3: Crushed sand of sandstones, produced in Ibaraki-shi, Osaka prefecture
4: Mountain sand, produced in Ena-shi, Gifu prefecture
5: Sandstone 1505, produced in Ibaraki-shi, Osaka prefecture Fine bubble water treatment was carried out under the following conditions.

40 kg of samples 2 and 4 were each put on a tray. Each sample was sprayed with 2 litters of fine bubble water, and stirred so that the fine bubble water homogeneously dispersed throughout the tray. Then, the samples were covered with newspaper, and after the newspaper was sprayed with fine bubble water, the samples were left at rest for 24 hours in a state where the newspaper was wet.

Each of samples 1, 3, and 5 was loaded on the back of a 10 t truck and showered with 150 litters of water for 45 seconds by a water sprinkling shower. Then, after 12 hours, 40 kg of sand was extracted from each bed as samples.

Next, with respect to (FB-treated) samples 1 to 5 subjected to the fine bubble water treatment and (untreated) samples 1 to 5 not subjected to the fine bubble water treatment, the alkali-silica reactivity test (chemical method) was carried out following JIS A 1145:2017.

About 10 kg of aggregate was extracted from each sample, and pulverized until particle size became 5 mm or smaller. After that, 1 kg of aggregate was extracted and screened with a sieve that allows 300 μm sized particles to pass therethrough and a sieve that allows 150 µm sized particles to pass therethrough, to get sand with particle size of only 300 µm to 150 µm as a specimen. Then the specimens were washed with running water, rinsed with about 1 litter of water, and then dried at a temperature of 150° C.±5° C. for 20 hours±4 hours. The resultants were taken as samples.

A reaction operation process between alkali and an aggregate specimen was performed in the following manner.

1 mmol/L sodium hydroxide standard solution was added to a specimen to cause reaction for 24 hours at a temperature of 30±1° C. in a constant-temperature water bath. Then, the specimen was filtered under pressure, in order to obtain the undiluted solution of the specimen. Part of the undiluted solution was extracted, and water was added thereto, in order to produce a diluted specimen. Part of the diluted specimen was extracted, and titrated with 0.05 mol/L hydrochloric acid standard solution using phenolphthalein indicator, and then the alkali concentration decreased amount was calculated based on the measurement values.

The amount of dissolved silica was measured with the atomic absorption spectrophotometry method. More specifically, a diluted specimen solution was sprayed into a high-temperature flame of acetylene-nitrous oxide, and the absorbance was measured at 251.6 nm. A measurement value was calculated based on a prepared calibration curve.

Figure 6:
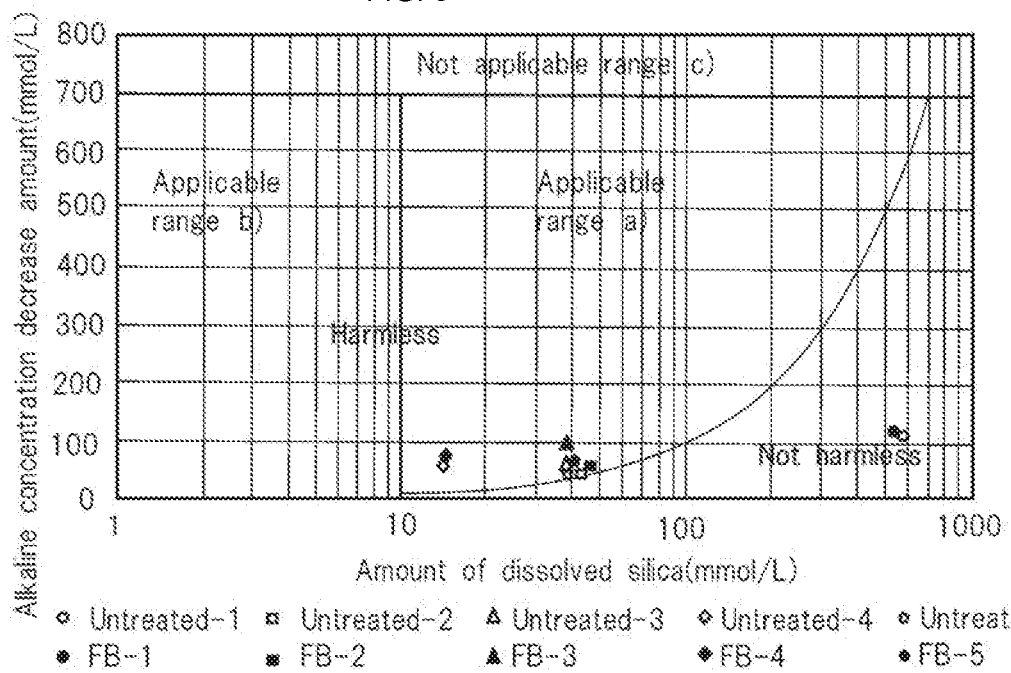
FIG. 6 is a graph representing results of an alkali-silica reactivity test of aggregates.

The table 3 and the graph of FIG. 6 depict the amount of dissolved silica (Sc) and alkali concentration decreased amount (Rc) with respect to the samples 1 to 5.

TABLE 3

| Sample.No | Measurement item | Un-treated | FB-treated |
|---|---|---|---|
| 1 | Fused Silica (Sc) | 567 | 549 |
|   | Alkaline concentration decrease amount (Rc) | 104 | 108 |

TABLE 3-continued

| Sample.No | Measurement item | Un-treated | FB-treated |
|---|---|---|---|
| 2 | Fused Silica (Sc) | 42 | 45 |
|   | Alkaline concentration decrease amount (Rc) | 48 | 49 |
| 3 | Fused Silica (Sc) | 38 | 39 |
|   | Alkaline concentration decrease amount (Rc) | 52 | 56 |
| 4 | Fused Silica (Sc) | 15 | 15 |
|   | Alkaline concentration decrease amount (Rc) | 75 | 84 |
| 5 | Fused Silica (Sc) | 37 | 39 |
|   | Alkaline concentration decrease amount (Rc) | 39 | 41 |

As seen in the table 3 and FIG. 6, each sample with fine bubble water treatment exhibits more reduction in alkali concentration than a corresponding untreated sample. Some samples exhibit more amount of dissolved silica, but the increased amount is so little as to have no influence. As a result, all samples exhibit a shift from a judgment application line toward "harmless."

Thus, it is understood that the fine bubble water treatment reduces the risk of cracks in cement-mixed concrete, which improves the soundness of the concrete.

Third Embodiment

The following describes results of a soundness test of aggregate using sodium sulphate.

This test was carried out following JIS A 1122:2014. In this test, the sample 5 used in the second embodiment was used (for an untreated sample and for a sample with fine bubble water treatment). The samples were impregnated with sodium sulphate solution (saturated solution), and then dried at 105° C. by a drier. This process was repeated five times. After that, the samples were classified using sieves to measure particle size.

Figure 7:
FIG. 7 is a graph representing results of a soundness test of aggregates.

The table 4 depicts the results of the untreated sample, and the table 5 depicts the results of the sample with fine bubble water treatment. In addition, FIG. 7 depicts the results of these two samples.

TABLE 4

| Passable sieve size mm | Unpassable sieve size mm | Weight of sample g | Weight fraction % | Weght before treatment g | Weght after treatment g | Sample loss weight fraction % | Aggregate loss weight fraction % |
|---|---|---|---|---|---|---|---|
| 10 | 5 | 180.0 | 57.0 | 368.7 | 363.0 | 1.5 | 0.9 |
| 15 | 10 | 1333.0 | 43.0 | 520.1 | 490.2 | 5.7 | 2.5 |
| total | | 3133.0 | 100.0 | 888.8 | 853.2 | | 3.4 |

TABLE 5

| Passable sieve size mm | Unpassable sieve size mm | Weight of sample g | Weight fraction % | Weght before treatment g | Weght after treatment g | Sample loss weight fraction % | Aggregate loss weight fraction % |
|---|---|---|---|---|---|---|---|
| 10 | 5 | 180.0 | 58.0 | 336.6 | 330.9 | 1.7 | 1.0 |
| 15 | 101 | 1333.0 | 42.0 | 547.6 | 530.6 | 3.1 | 1.3 |
| total | | 3133.0 | 100.0 | 884.2 | 861.5 | | 2.3 |

As seen in the table 4, table 5, and FIG. 7, the sample with fine bubble water treatment contains less amount of aggregate whose particle size is smaller than 10 mm. This result indicates that the soundness of aggregate is improved by the fine bubble water treatment.

Fourth Embodiment

The following describes results of a darkening control test (1). In this darkening control test (1), the states of micas (darkening) appearing on the water surface were observed.

The aggregate of sample 5 used in the second embodiment was used. 1 kg of aggregate was put on two trays, and 3.26 kg of fine bubble water and 3.26 kg of groundwater were respectively added to these trays for soaking. These trays were left at rest for 10 minutes, and then all water was removed. Then, about 3 kg of groundwater was added to these two samples for soaking, and then the states of the samples were confirmed visually. These states are taken as a status A.

After that, 0.1 kg of cement was added and mixed, and the states of the samples were confirmed visually. These states are taken as a status B.

In the status A, the sample with fine bubble water treatment had more darkening than the sample with groundwater treatment. It is considered that the fine bubble water causes more micas to appear. In other words, it is expected that the fine bubble water treatment is able to remove more micas.

In the status B, the sample with fine bubble treatment had less micas than the sample with groundwater treatment, and contained well-dispersed cement. Thus, it is confirmed that, after cement is added, the sample with fine bubble treatment had less darkening.

Fifth Embodiment

The following describes a darkening control test (2). In this darkening control test (2), the states of micas (darkening) appearing on the water surface were observed.

The aggregate of sample 5 used in the second embodiment was used. 0.6 kg of aggregate and 0.10 kg of cement were put on two trays and mixed. Then, fine bubble water and groundwater were respectively added to these trays and stirred, and then left at rest for 10 minutes.

It was confirmed that the sample with groundwater had much darkening (oil supernatant), whereas the sample with fine bubble water had less darkening and more dispersion than the sample with groundwater.

Therefore, it is confirmed that the use of fine bubble water as dispersing water promotes the dispersion of cement and micas, thereby improving the dispersibility and lowering the risk of darkening. It is considered that this indicates an enhancement of the dispersibility of cement and aggregate and therefore it is possible to improve the properties of concrete.

OPERATION AND EFFECTS

The following describes the features of the invention derived from the above-described embodiments, together with the problems, effects, and others as needed. The meanings of terms, examples, and others described for each feature may be applied as the meanings of terms and examples described for other features using the same wordings.

The aggregate surface treatment method of the present invention is designed to perform surface treatment on aggregate for ready-mixed concrete by bringing fine bubble water containing fine bubbles into contact with the aggregate.

By doing so, the aggregate surface treatment method is able to cover the surface of the aggregate with the fine bubble water because of its high penetration capability, and to improve the dispersibility.

Further, the aggregate surface treatment method is designed to perform the surface treatment on the aggregate by impregnating the aggregate with the fine bubble water and then removing at least part of the fine bubble water.

By doing so, the aggregate surface treatment method is able to not only perform the surface treatment but also remove unwanted dirt and particulates, so as to further improve the properties of the aggregate.

Still further, the aggregate surface treatment method is designed to perform the surface treatment on the aggregate by causing the fine bubble water to adsorb onto the aggregate.

This keeps the effect of dispersibility improvement, so that the aggregate surface treatment and the ready-mixed concrete producing may be performed at different locations.

Still further, the aggregate surface treatment method is designed to perform the surface treatment on the aggregate by spraying or showering the aggregate with the fine bubble water.

By thoroughly spraying or showering the aggregate with the fine bubble water, the fine bubble water sufficiently penetrates the aggregate, so as to provide a sufficient effect of dispersibility improvement.

Still further, the aggregate surface treatment method is designed to periodically perform the surface treatment on the aggregate using the fine bubble water.

The fine bubble water penetrates the aggregate, which lengthens the time for the aggregate to get dry. Therefore, for example, by performing the surface treatment on the aggregate every 24 hours or every two or three days, it is possible to ensure that the aggregate does not get dry. In this connection, the intervals for the surface treatment may vary depending on a treatment method and the amount of fine bubble water to be used. For example, it is preferable that the surface treatment be performed 18 to 30 hours after a previous surface treatment in the case of showering or spraying. In the case of employing a process of impregnating with liquid and removing the liquid, it is preferable that the surface treatment be performed 24 to 48 hours after most liquid is removed.

The method for producing ready-mixed concrete in the present invention is designed to mix surface-treated aggregate, which is prepared by bringing fine bubble water containing fine bubbles into contact with aggregate for ready-mixed concrete, cement, and mixing water.

Figure 5:
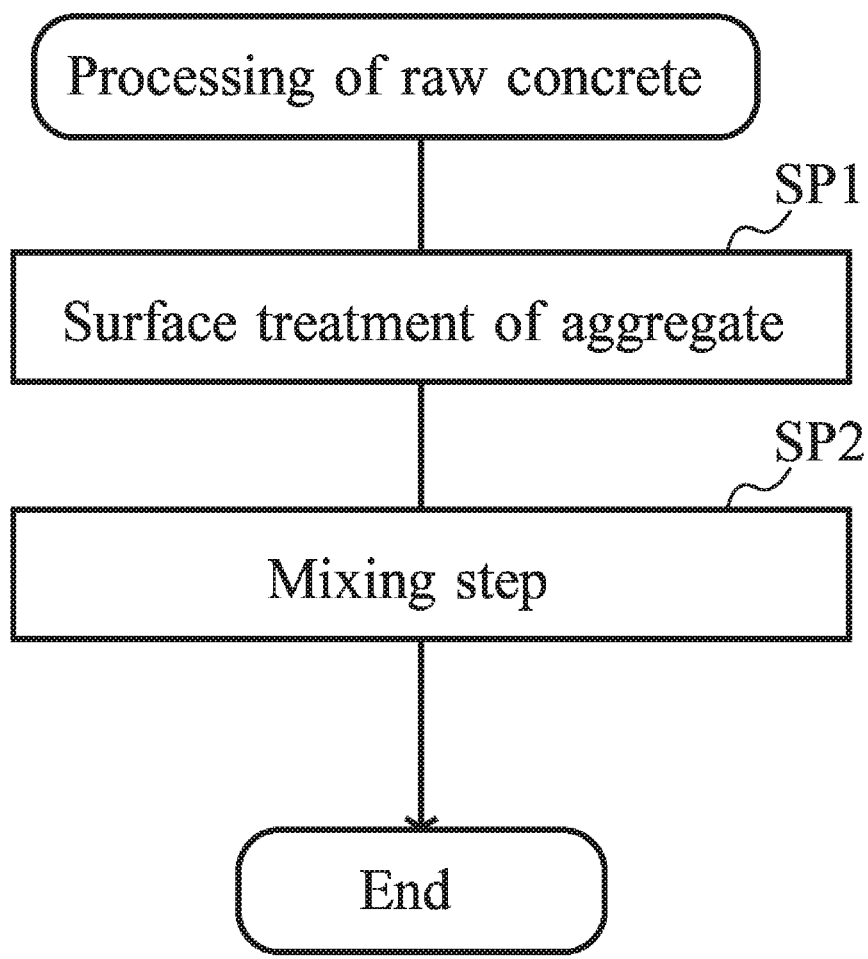
FIG. 5 is a flowchart for explaining a process for producing ready-mixed concrete.

That is, as illustrated in FIG. 5, in the ready-mixed concrete producing process, the surface treatment is performed on aggregate using fine bubble water in step SP1, and then the surface-treated aggregate, cement, water, and other components as needed are mixed in step SP2. As the mixing water, fine bubble water, general water, such as tap water or industrial water, or another may be used.

This makes it possible to improve the dispersibility of the aggregate, so as to make the mixing stage easy, enhance the workability of ready-mixed concrete, and improve the properties of a concrete structure.

In addition, the method for producing ready-mixed concrete is designed to impregnate the aggregate with the fine bubble water and to use the fine bubble water as the mixing water.

By doing so, compared with a process of only impregnating aggregate with fine bubble water in advance and then adding and mixing other components thereto, the method for producing ready-mixed concrete makes it possible to improve the dispersibility of aggregate, so as to provide the above-described effects with simple configuration.

The method for producing ready-mixed concrete in the invention is designed to use fine bubble water as the mixing water at the time of mixing the aggregate for ready-mixed concrete and cement.

By doing so, it is possible to improve the dispersibility of cement and aggregate, lower the risk of darkening, and improve the properties of concrete.

The present invention is applicable to surface treatment of aggregate that is to be mixed into ready-mixed concrete, for example.

The present invention achieves an aggregate surface treatment method, which is able to improve the properties of concrete, and a method for producing ready-mixed concrete.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

The invention claimed is:

1. A method comprising:
  performing a surface treatment on aggregate for ready-mixed concrete, the surface treatment comprising:
    providing the aggregate, and
    bringing bubble water containing bubbles at a concentration of more than 0.1E08 pieces/ml into contact with the aggregate without using an air entraining (AE) agent and/or an AE water reducing agent; and
  removing the bubble water from the aggregate by evaporation or filtering.

2. The method according to claim 1, wherein bringing the bubble water into contact with the aggregate includes impregnating the aggregate with the bubble water and then removing the bubble water.

3. The method according to claim 1, wherein performing the surface treatment on the aggregate causes the bubble water to adsorb onto the aggregate.

4. The method according to claim 1, wherein bringing the bubble water into contact with the aggregate includes spraying or showering the aggregate with the bubble water.

5. The method according to claim 1, wherein the bubble water contains the bubbles at a concentration of more than 0.2E08 pieces/ml.

6. The method according to claim 1, wherein a mean diameter of the bubbles ranges from about 50 nm to about 250 nm.

7. A method comprising:
  performing a surface treatment on aggregate for ready-mixed concrete, the surface treatment comprising:
    providing the aggregate, and
    bringing bubble water containing bubbles at a concentration of more than 0.1E08 pieces/ml into contact with the aggregate without using an air entraining (AE) agent and/or an AE water reducing agent;
  removing the bubble water from the aggregate by evaporation or filtering; and
  mixing cement, mixing water, and the aggregate from which the bubble water has been removed.

* * * * *